INVENTORS
KENNETH BERNARD KEATING
JAMES EDGAR MCNUTT

BY *Robert W. Black*

ATTORNEY

OH⁻ + CN⁻ ELECTROLYTE          OH⁻ ELECTROLYTE

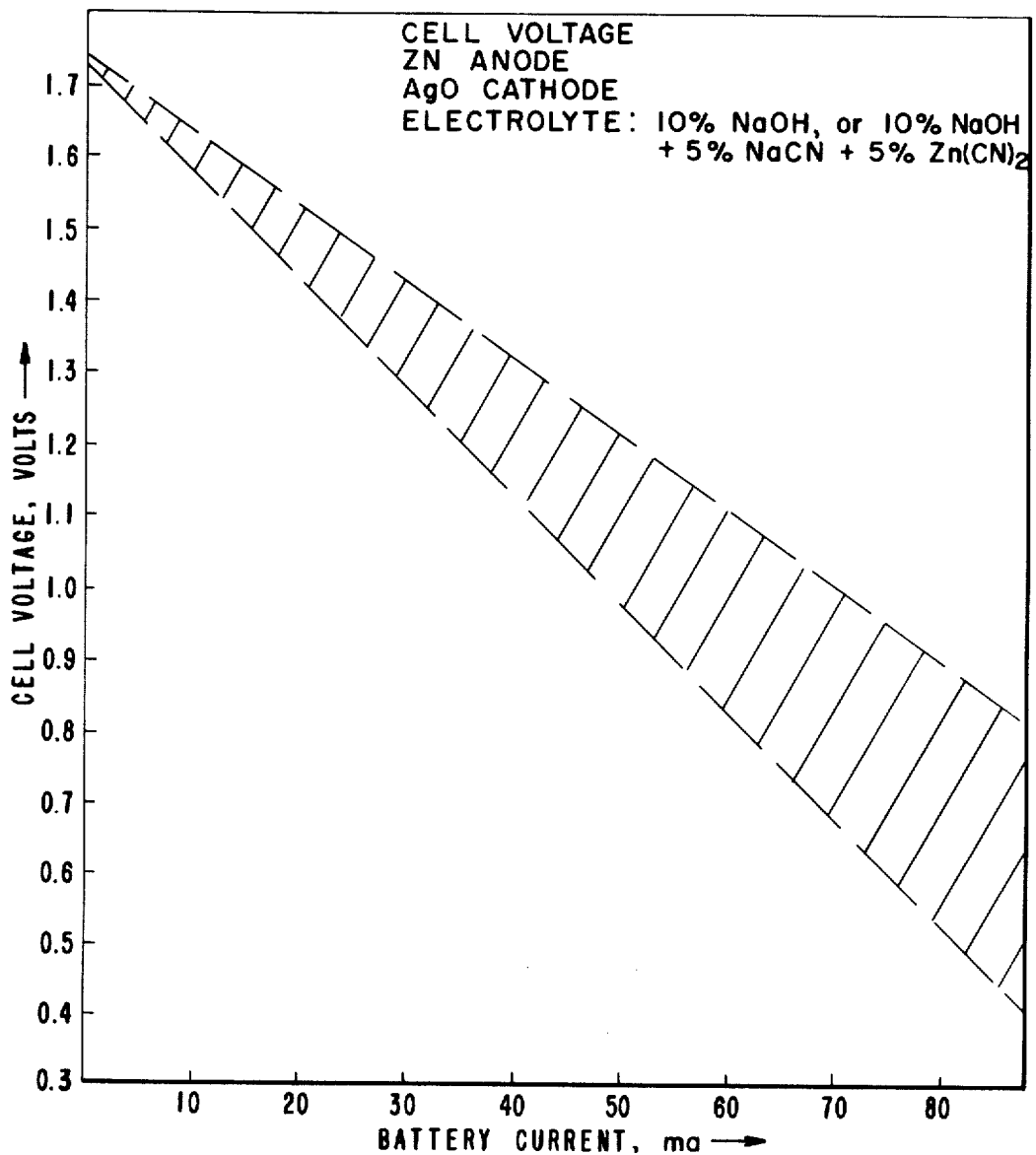

United States Patent Office 3,540,935
Patented Nov. 17, 1970

3,540,935
ALKALINE SECONDARY BATTERY AND
ELECTROLYTE THEREFOR
Kenneth Bernard Keating and James Edgar McNutt, Wilmington, Del., assignors to E. I. du Pont de Nemours and Company, Wilmington, Del., a corporation of Delaware
Continuation-in-part of application Ser. No. 708,012, Feb. 26, 1968. This application Jan. 15, 1969, Ser. No. 807,473
Int. Cl. H01m 27/00, 43/04, 41/00
U.S. Cl. 136—86                                17 Claims

ABSTRACT OF THE DISCLOSURE

The problem of recharging an alkaline secondary battery (such as a zinc-air or cadmium-air secondary battery) due to zinc or cadmium dendrites forming on the anode during recharging is overcome by incorporating at least one complexing agent for the active anode metal cations present in the alkaline electrolyte. Such a complexing agent is preferably a cyanide salt of an alkali metal, the active anode metal, or mixtures thereof.

CROSS-REFERENCE TO RELATED APPLICATIONS

This application is a continuation-in-part of pending application Ser. No. 708,012, now abandoned, filed Feb. 26, 1968.

BACKGROUND OF THE INVENTION

Field of invention

This invention relates to alkaline secondary batteries and electrolytes therefor and more particularly to rechargeable zinc-air secondary batteries and electrolytes therefor.

Prior art

Many alkaline batteries have been developed for converting chemical energy to electrical energy. A particularly useful class of these batteries are the ones that use zinc or cadmium anodes and alkaline electrolyte and any one of a number of cathodes. These cathodes can be based on either valence changes in some component of the cathode, such as occur in so-called nickel or silver electrodes; cathodes may also be based on a catalyst for a chemical reaction, such as in the zinc-oxygen or cadmium-oxygen batteries. Various materials may be used as catalyst. The anode reaction is unaffected by what cathode is chosen, and the same anode chemistry can be combined with different cathodes in different batteries, depending on the intended use. For example, some batteries are intended to be used in vacuum and for this or some other reason must be completely sealed. In this instance, one would generally choose a cathode which depends on a change in valence so that gas does not flow in or out. Batteries based on zinc and in some instances cadmium are quite useful as primary batteries and would be even more attractive as secondary batteries if the anodes could be recharged. A good example of the difficulty encountered with all of these batteries is the zinc-oxygen and zinc-air battery which is discussed below. The same problems with the anode, however, are found in the other kinds of batteries referred to above, such as nickel-zinc.

The electrochemistry of zinc-oxygen and zinc-air batteries with alkaline electrolytes is well-known. As typically operated, these batteries comprise zinc anodes; porous-carbon, nickel or silver cathodes; and an electrolyte based on sodium hydroxide or potassium hydroxide. The anode reaction in such a battery is generally considered to be:

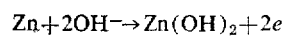

and the cathode reaction is:

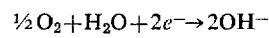

The total cell reaction is:

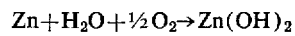

Zinc-air batteries hold great promise because they utilize cheap materials to produce a high-energy density and can be operated at moderate temperatures ($-40°$ F. to $150°$ F.). Thus, they hold an advantage over other high-energy density systems which involve expensive materials (like silver-zinc) or must be operated at high temperatures (like sodium-sulfur batteries).

The main problem which has kept zinc-air batteries from extensive and important applications is that they cannot be recharged as can be the lead-acid, silver-zinc and sodium-sulfur batteries. In attempting to redeposit the zinc on the anode out of the sodium or potassium hydroxide electrolyte, the zinc on the anode becomes spongy or dendritic, flakes off and what remains on the anode is characterized by high electrical resistance, thus reducing the battery power output. Because of this, commercially available zinc-air batteries require mechanical replacement of the anode after each discharge; in some cases fresh electrolyte is also required.

Zinc-air batteries have also been developed which are thrown away after one discharge. Other batteries such as nickel-zinc are too expensive to throw away, and this kind of battery will never become widely used until a solution to the zinc anode recharging problem is effected.

SUMMARY OF THE INVENTION

According to the present invention, there is provided a secondary battery comprising an anode wherein the active metal is selected from the group consisting of zinc and cadmium, a porous cathode, a source of oxygen to the cathode, and an alkaline electrolyte containing at least one complexing agent for the cations of the active metal of the anode present in the electrolyte. A preferred battery is a rechargeable zinc-air battery having an anode wherein the active metal is zinc, a catalytic porous cathode and an alkaline electrolyte containing cyanide anions as the zinc cations complexing agent.

There is also provided an aqueous electrolyte for a secondary battery, comprising 3-12 normal alkali metal hydroxide containing about 0.1 to 20% by weight of at least one active anode metal cation complexing agent.

DESCRIPTION OF THE INVENTION

Brief description of drawings

FIG. 6 is a graph showing that the zinc-anode cell output is essentially unaffected by the presence of cyanide anions in the electrolyte using a silver-oxide valence change cathode.

Detailed description of the invention

Figure 1:
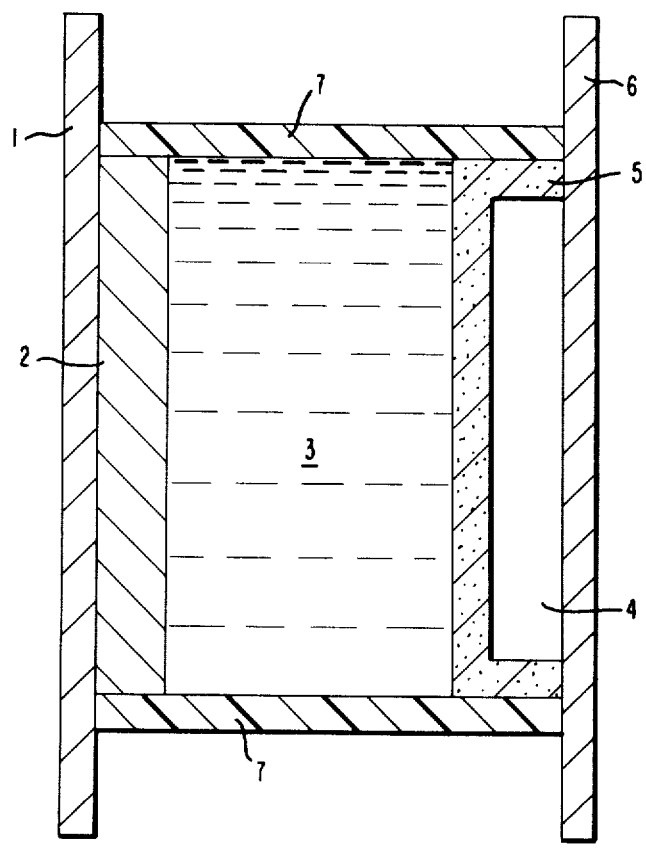
FIG. 1 is a sectional view of one form of a zinc-air secondary battery cell.

The structure of one form of a zinc-air battery cell is shown in FIG. 1.

The anode conductor 1 is a low-resistance metal lead used as one of the two poles through which power is withdrawn from the secondary battery during discharge or applied to the battery during the recharge period. The zinc anode 2 is in intimate electrical contact with the anode conductor so that the electrons generated at the interface between the anode and the battery electrolyte 3 can enter the external circuit with minimum loss inside the anode. The alkaline electrolyte 3 provides a path for migration of hydroxide ions from the porous catalytic cathode 5 where they are generated during discharge to the anode 2 where they participate in the anode reaction. The alkaline electrolyte as discussed hereinafter is an aqueous solution of an alkali metal hydroxide and a complexing agent for the active anode metal cations. Oxygen or air, as a source of oxygen, is supplied through a plenum 4 to the porous cathode 5 where it participates in the cathode reaction. Electrons are supplied to the porous cathode from the external circuit through the cathode conductor 6 during discharge of the battery and withdrawn during the recharge operation. The electrolyte is contained within the battery by walls 7 made up of an inert material such as "Neoprene." By placing and connecting a predetermined number of these cells in series, a battery is formed.

The best battery performance occurs when the electrolyte is about 1–12 normal in hydroxyl ions. Preferred electrolytes, particularly for zinc or cadmium anodes, are alkali metal hydroxides, especially sodium or potassium hydroxide being about 3–12 normal in hydroxyl ions, preferably about 6–10 normal. Other alkaline electrolytes would include magnesium hydroxide, lithium hydroxide and barium hydroxide.

It has been found that the addition of complexing agents for the active anode metal cations in the alkaline electrolyte changes the nature of the recharging process as evidenced by non-dendritic deposits. For instance, with a solid anode the deposited material essentially conforms to the shape and density of the original anode. By the term "complexing agent" is meant a material or agent which increases the solubility of the anode material in solution and changes the species in which the anode material ions are dissolved in the electrolyte. One of the ways the species is changed is the formation of stable, soluble complexes with the anode cation which are either anionic or cationic; stable meaning that there is no material formed either by reaction or decomposition that is irreversibly lost from the system either by volatilization or precipitation. The important criterion is that the solute added to the electrolyte is a complexing agent for the active anode metal cations. For example, for zinc or cadmium anodes, it has been found that cyanide anions act as a complexing agent for the zinc or cadmium cations so as to increase the solubility of the zinc or cadmium in the electrolyte. The cyanide anions can be added in any convenient form such as a cyanide salt of an alkali metal, the active anode metal or mixtures thereof. Preferably, the cyanide is sodium cyanide or potassium cyanide and zinc cyanide for a zinc-air battery or cadmium cyanide for a cadmium-air battery in an amount such that the electrolyte contains 0.1–20% of cyanide, preferably about 3–10% cyanide.

Although potassium cyanide is more expensive, it is preferable to sodium cyanide in some circumstances. For example, if untreated air is to be used at the cathode, potassium cations would be preferred to retard the precipitation of carbonates in the battery caused by carbon dioxide in the air. Some of the cyanide anions can be added as the active anode metal cyanide, such as zinc cyanide, which will not only contribute the highly desirable cyanide anion to the electrolyte, but will also build up the metal content of the electrolyte so that none of the anode need to be used to saturate the battery electrolyte.

In addition to cyanides, other complexing agents are 1-mercapto - 2 - hydroxyethane, 2,6-pyridine dicarboxylic acid and N-substituted derivatives thereof such as N-oxide or N-benzyl, nitrilotriacetic acid, and diamines and polyamines such as ethylenediamine-N,N-diacetate, ethylene diamine tetraacetate (EDTA), ethylenediamine diacetate dipropionate, ethylenediamine (hydroxyethyl) triacetate, propylene 1,2-diamine tetraacetate, 1,3-diamino-2-propanol tetraacetate, diaminodiethylether tetraacetate, diethylenetriamine pentaacetate, diethylenetriamine pentacetic acid, triethylene tetramine, pentaethylene hexamine and 1,2-diaminocyclohexane-N,N'-tetraacetic acid. Generally, the diamines will have the general formula:

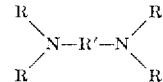

where hydrogen is 0–2 of the R groups and the balance of the R groups each contain 1–4 carbon atoms with at least one of the R groups having a hydroxy or carboxylate grouping; and R' is ethylene or propylene with or without a hydroxyl side group, or an ethyl ether group. The polyamines will generally have the formula:

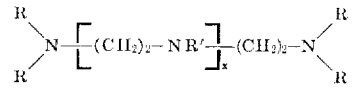

where hydrogen is 0–4 of the R groups and the balance of the R groups are as defined above; R' is hydrogen or R and X is 1–4. The diamines and polyamines are helpful in improving the rechargeability by making the redeposited metal more dense and by improving the current efficiency of recharging, particularly when added along with cyanides.

The anodes for the battery are preferably those characterized by dendritic deposits on recharging in the absence of a complexing agent and can be of two basic types: (1) a substrate material such as graphite, steel, etc. upon which the zinc, cadmium or other active anode metal is deposited, and (2), the anode consists wholly of the energy-producing metal; that is, it is a plate, rod, etc. of zinc, cadmium or other metal. Active anode metals which also form dendrites on recharging in the absence of a complexing agent are nickel, gold and platinum.

Suitable cathodes are of the valence change type or catalyst type and should not dissolve in the presence of the complexing agent. Such cathodes can be made of graphite or carbon, palladium, platinum, nickel, silver, silver oxide, copper sulfide, iron, steel, especially case-hardened steel, spinels, intermetallic compounds and interstitial compounds such as $Fe_3C$ and $Ni_3C$. Particularly preferred cathodes are carbon, graphite or nickel. The carbon or graphite cathodes are usually made from powder particles, bonded together, perhaps with a binder, to make highly porous electrodes, the pores being uniform, small and evenly distributed. The cathodes sometimes are made or treated so as to be hydrophobic, to prevent flooding or penetration of the porous electrode by the electrolyte. To accomplish this, polytetrafluoroethylene particles can be mixed with the carbon or other cathode material before the cathode is fabricated; or the carbon cathode may be sprayed or impregnated with a liquid that will leave a hydrophobic residue. Solutions of paraffin are used for this.

It should be apparent that the anodes and cathodes can be used in numerous combinations, and in some instances the anode metal may become a cathode material or vice versa. The important consideration is that the electrolyte contains a complexing agent for the cations of the anode metal, regardless of the active metal used as the anode. However, preferred combinations are a zinc or cadmium anode with a porous graphite or nickel cathode which will employ a sodium or potassium hydroxide electrolyte containing some zinc or cadmium cyanide and cyanide anions as the zinc or cadmium complexing agent. Of course, instead of air, oxygen can be used.

Cells themselves can be constructed out of a number of materials which will be satisfactorily inert to the battery electrolyte. These include, for example, plastics such as polyethylene, polypropylene, methyl methacrylate, and rubbers such as "Neoprene."

The batteries may also have a third electrode, e.g., made of graphite, built into the cell to serve as the recharging anode to avoid deleterious effects on the battery cathode.

The invention can be further illustrated by referring to the following examples wherein percentages are by weight unless otherwise indicated.

EXAMPLE 1

Four electrochemicals cells are prepared, each with a zinc foil anode. Two cells employ a platinum cathode and the other two cells employ a graphite cathode. One of the platinum cathode cells and one of the graphite cathode cells use a 10% sodium hydroxide solution as the electrolyte, while the second platinum cathode cell and second graphite cathode cell use as the electrolyte an aqueous solution of 10% sodium hydroxide, 5% zinc cyanide and 5% sodium cyanide. During operation, the cathode-electrolyte interface is continuously sparged with gaseous oxygen.

Figure 3:
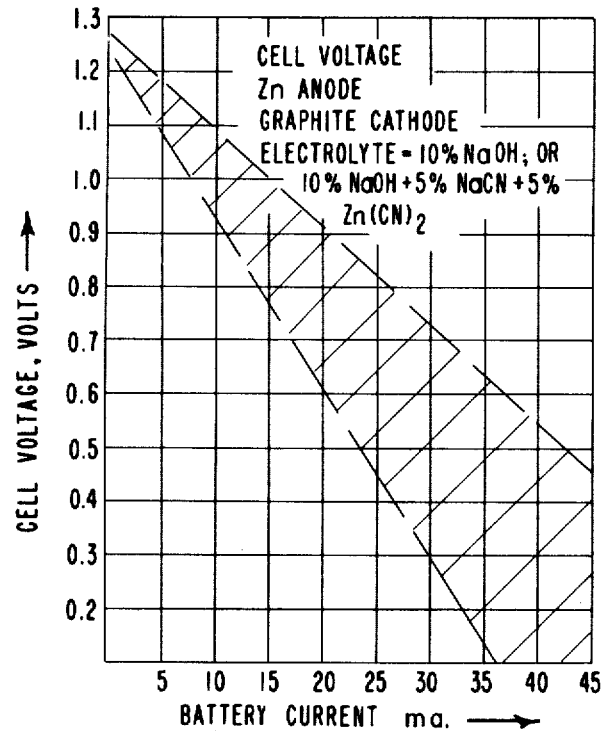
FIG. 3 is a graph showing that the zinc-air cell output is essentially unaffected by the presence of cyanide anions in the electrolyte using a platinum cathode.
Figure 4:
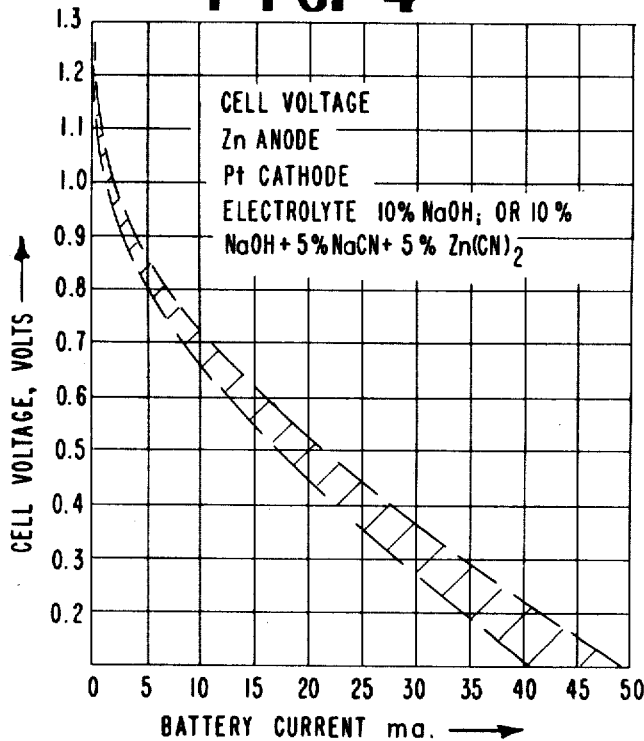
FIG. 4 is a graph showing that the zinc-air cell output is essentially unaffected by the presence of cyanide anions in the electrolyte using a graphite cathode.

Measurements of cell voltage and the polarization of both electrodes as a function of cell current show no significant alterations resulting from the addition of the cyanide complexing agent to the electrolyte. The measurements fall within the band shown in FIG. 3 for the graphite cathodes and FIG. 4 for the platinum cathodes. This indicates that the electrochemical output of the cell is not degraded by the presence of the cyanide complexing agent since the cell voltage with only sodium hydroxide solution as the electrolyte also falls within the bands.

EXAMPLE 2

Figure 5:
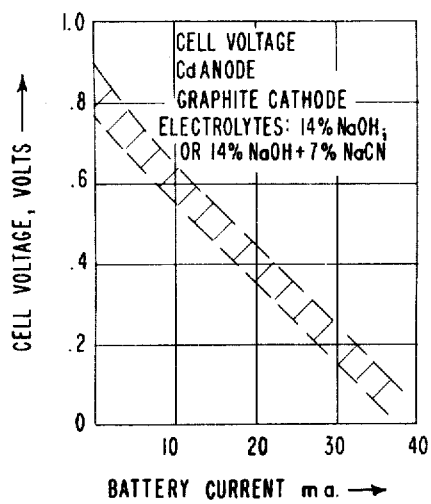
FIG. 5 is a graph showing that the cadmium-air cell output is essentially unaffected by the presence of cyanide anions in the electrolyte using a graphite cathode.

Example 1 is repeated except the two cells used employ cadmium anodes and graphite cathodes. One cell uses 14% sodium hydroxide as electrolyte and the second cell uses an aqueous solution of 14% sodium hydroxide and 7% sodium cyanide as electrolyte. The measurements for both cells fall within the band shown on FIG. 5.

EXAMPLE 3

Example 1 is repeated except the two cells used employ silver oxide as valence change cathodes. One cell uses 10% sodium hydroxide as electrolyte and the second cell uses an aqueous solution of 10% sodium hydroxide, 5% zinc cyanide and 5% sodium cyanide as electrolyte. The measurements for both cells fall within the band shown on FIG. 6 showing that electrochemical output of the cell is not degraded by the presence of cyanide.

EXAMPLE 4

Figure 2:
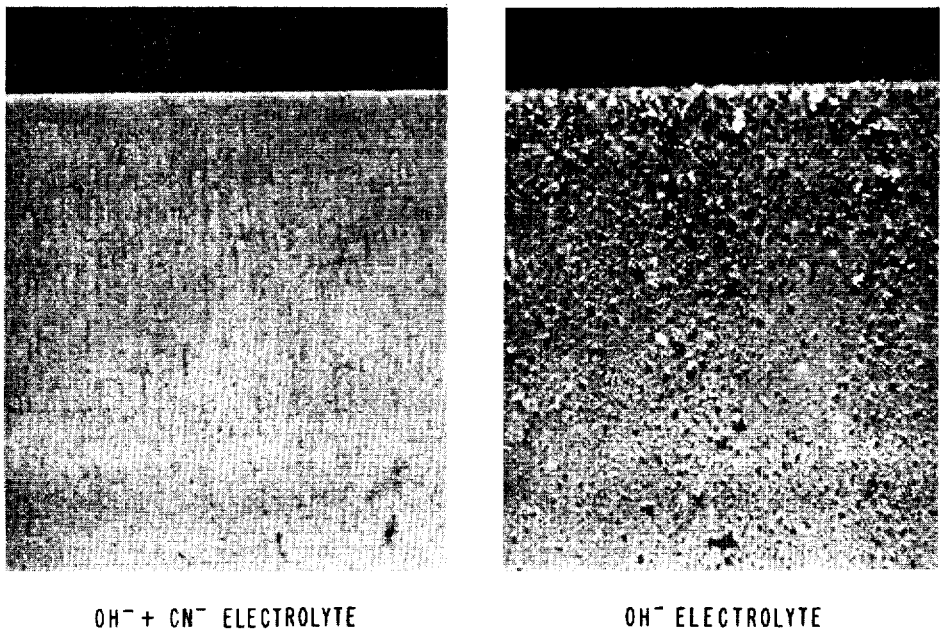
FIG. 2 is a photomicrograph at a 20× magnification comparing redeposited zinc on the anodes from a hydroxide electrolyte and the electrolyte containing cyanide anions.

To demonstrate the effectiveness of cyanides as complexing agents which improve the rechargeability of zinc-air batteries, two electrolytes are prepared for use in batteries, a cell of which is shown in FIG. 1. Bath No. 1 is an aqueous solution of 30% KOH, 6% $Zn(CN)_2$ and 10% NaCN. Bath No. 2 is an aqueous solution of 30% KOH, saturated with about 1.5% ZnO. Two zinc-air batteries are operated, one with each electrolyte. Graphite cathodes are used with air as the source of oxygen. The anodes are steel plated with about a .010-inch thickness of zinc. After being put through 64 discharge-recharge cycles, the anodes are removed from the batteries. It is found that the anode used in Bath No. 1 is quite similar in appearance to its original condition; however, the anode used in Bath No. 2 is rough, has many dendritic properties and some nonadherent zinc has fallen to the bottom of the battery. Photographs at 20× show the appearance of these panels as shown in FIG. 2.

EXAMPLE 5

To show that more than one complexing agent can be used to advantage, two electrolytes are prepared as follows: Bath No. 1 is an aqueous solution of 30% KOH, 6.5% KCN, 1.5% ZnO and 5% disodium ethylenediamine tetraacetate (EDTA). Bath No 2 is identical except that no disodium ethylenediamine tetraacetate is included. Zinc-air batteries are prepared using 10 mil thick zinc foil for anodes and graphite supplied with air as the cathodes. Each battery is subjected to 30 discharge-recharge cycles. At the completion of the experiment, the surface condition of both anodes is excellent, being quite similar to the original condition, owing to the presence of cyanide as zinc cation complexing agent. However, during the recharge cycles, it is noted that, in the electrolyte containing disodium ethylenediamine tetraacetate, the anode is recharged with higher current efficiency, so that in Bath No. 1 fewer coulombs of recharging current are required to restore the anode to its original condition after each discharge.

What is claimed is:

1. A secondary battery comprising: an anode wherein the active metal is selected from the group consisting of zinc and cadmium, a cathode comprising an electrically conductive porous cathode and a source of oxygen to said cathode, and an alkaline electrolyte containing at least one complexing agent for the cations of the active metal of the anode present in the electrolyte, said complexing agent being selected from the group consisting of alkali metal cyanides, cyanide salts of the active metal of the anode and mixture thereof.

2. The battery of claim 1 wherein the electrolyte is an alkali metal hydroxide solution.

3. The battery of claim 2 wherein the alkali metal hydroxide is selected from the group consisting of potassium hydroxide and sodium hydroxide.

4. The battery of claim 3 wherein the porous cathode is catalytic and is selected from the group consisting of carbon, graphite, platinum, nickel, silver, alloys thereof and compounds thereof.

5. The battery of claim 2 wherein the alkali metal hydroxide electrolyte contains about 0.1 to 20% by weight of a cyanide salt of an alkali metal, the active anode metal or mixtures thereof as complexing agent.

6. The battery of claim 3 wherein the complexing agent is a mixture of cyanide anions and disodium ethylenediamine tetraacetate.

7. A rechargeable zinc-air secondary battery comprising: an anode wherein the active metal is zinc, a porous cathode of carbon, nickel or graphite, a source of oxygen to the cathode and a 1–12 normal sodium or potassium hydroxide electrolyte containing about 0.1 to 20% by weight of a cyanide salt of an alkali metal, zinc, or mixtures thereof.

8. The battery of claim 7 wherein the electrolyte further contains about 1 to 10% by weight of disodium ethylenediamine tetraacetate.

9. A rechargeable secondary battery having an anode wherein the active metal is selected from the group consisting of zinc and cadmium which is susceptible to dendritic growth on recharging, an electrically conductive porous cathode and a source of oxygen to said cathode and an electrolyte comprising 3–12 normal alkali metal hydroxide solution containing about 0.1 to 20% by weight of at least one complexing agent for the cations of the active metal of the anode present in the electrolyte, said complexing agent being a cyanide salt of an alkali metal, the anode active metal or mixtures thereof, whereby upon recharging of the battery, the active metal held in the electrolyte solution by the complexing agent is plated on the anode from the electrolyte solution essentially free of dendritic growth.

10. A process of recharging a secondary battery having an anode wherein the active metal is selected from the group consisting of zinc and cadmium, an electrically conductive porous cathode and a source of oxygen to said cathode and an alkali metal hydroxide electrolyte comprising: applying a voltage to the anode, so as to make it cathodic, sufficient to recharge the battery in the presence of at least one complexing agent selected from the group consisting of alkali metal cyanides, cyanide salts of the active metal of the anode and mixtures thereof contained in the electrolyte for the cations of the active metal of the anode present in the electrolyte, said complexing agent being a material which increases the solubility of the active metal in the electrolyte and forms stable, soluble complexes with the active metal cations.

11. The process of claim 10 wherein the active metal of the anode is zinc and the complexing agent is a cyanide salt of sodium, potassium, zinc or mixtures thereof.

12. The process of claim 11 wherein the cathode is a porous carbon, nickel or graphite cathode and has a source of oxygen.

13. The process of claim 12 wherein the alkali metal hydroxide is 1–12 normal and contains about 0.1 to 20% by weight of the cyanide salt.

14. The process of claim 10 wherein the recharging anode is the battery cathode.

15. The process of claim 10 wherein the recharging anode is an auxiliary recharging electrode.

16. The battery of claim 7 wherein the electrolyte contains about 3 to 10% by weight of the cyanide salt.

17. The process of claim 10 wherein the active metal of the anode is cadmium and the complexing agent is a cyanide salt of sodium, potassium, cadmium or mixtures thereof.

References Cited

UNITED STATES PATENTS

| | | | |
|---|---|---|---|
| 2,921,110 | 1/1960 | Crowley et al. | 136—100 |
| 3,294,587 | 12/1966 | Le Duc | 136—86 |
| 3,359,136 | 12/1967 | Merten et al. | 136—86 |

WINSTON A. DOUGLAS, Primary Examiner

H. A. FEELEY, Assistant Examiner

U.S. Cl. X.R.

136—24, 30